(12) United States Patent
Guedalia et al.

(10) Patent No.: US 6,807,254 B1
(45) Date of Patent: Oct. 19, 2004

(54) METHOD AND SYSTEM FOR INTERACTIVE MESSAGING

(75) Inventors: Jacob Leon Guedalia, Palo Alto, CA (US); Isaac David Guedalia, Bet Shemesh (IL)

(73) Assignee: NMS Communications, Framingham, MA (US)

( * ) Notice: Subject to any disclaimer, the term of this patent is extended or adjusted under 35 U.S.C. 154(b) by 0 days.

(21) Appl. No.: 09/186,620

(22) Filed: Nov. 6, 1998

(51) Int. Cl.$^7$ ............................................... H04M 1/64
(52) U.S. Cl. .................. 379/88.1; 379/67.1; 379/88.11; 379/88.12; 379/88.13; 379/88.14; 379/88.16
(58) Field of Search .......................... 379/67.1, 70, 76, 379/88.01, 88.05, 88.13, 88.14, 88.15, 88.16, 88.17, 88.22, 88.27, 900, 905, 908, 88.1, 88.11, 88.12; 704/260, 270; 709/217, 218, 219, 206

(56) References Cited

U.S. PATENT DOCUMENTS

| | | | | |
|---|---|---|---|---|
| 5,742,905 A | * | 4/1998 | Pepe et al. .................. | 455/461 |
| 6,014,427 A | * | 1/2000 | Hanson et al. ............. | 379/67.1 |
| 6,014,429 A | * | 1/2000 | LaPorta et al. .......... | 379/88.15 |
| 6,112,049 A | * | 8/2000 | Sonnenfeld ................. | 434/350 |
| 6,219,694 B1 | | 4/2001 | Lazaridis et al. ........... | 709/206 |
| 6,233,318 B1 | * | 5/2001 | Picard et al. | |
| 6,233,577 B1 | * | 5/2001 | Ramasubramani et al. .... | 707/9 |
| 6,246,983 B1 | * | 6/2001 | Zou et al. .................... | 704/260 |
| 6,256,666 B1 | * | 7/2001 | Singhal ....................... | 709/217 |
| 6,269,336 B1 | * | 7/2001 | Ladd et al. ................. | 704/270 |
| 6,285,984 B1 | * | 9/2001 | Speicher ...................... | 705/14 |
| 6,308,188 B1 | * | 10/2001 | Bernardo et al. ........... | 715/530 |
| 6,333,973 B1 | * | 12/2001 | Smith et al. ............. | 379/88.12 |
| 6,350,066 B1 | * | 2/2002 | Bobo, II ................ | 395/200.36 |
| 6,377,927 B1 | * | 4/2002 | Loghmani et al. .......... | 704/275 |

OTHER PUBLICATIONS

Matthew Marx, et al., "MailCall: Message Presentation and Navigation in a Nonvisual Environment", http://acm.org/sigchi/chi96/proceedings/papers/Marx.mtm_txt.htm 2002.

Victor W. Zue "Navigating the Information Superhighway Using Spoken Language Interfaces", IEEE Expert, Oct. 1995, pp. 39–43.

Matthew Lennig, "Putting Speech Recognition to Work in the Telephone Network", IEEE Institute of Electrical and Electronic Engineers, Aug. 1990, pp. 35–41.

Frank Stajano, et al., "The Thinnest of Clients: Controlling It All Via Cellphone", Mobile Computing and Communications Review, vol. 2, No. 4, Oct. 1998.

"Hypertext Markup Language—2.0", located at http://www.w3.org/MarkUp/html–spec/html–spec_toc.html, Sep. 22, 1995, pp. 1–3.

"Proposal for a Handheld Device Markup Language", located at http://www.www.w3.org/TR/NOTE–Submission– HDML.html, May 9, 1997, pp. 1–4.

"Handheld Device Markup Language Specification", located at http://www.w3.org/TR/NOTE–Submission–HDML–spec.html, May 9, 1997, pp. 1–2.

"About VoxML", located at http://www.voxml.com/about.html.

S. St. Laurent, *XML: A Primer*, MIS:Press, Foster City, CA, 1998, chapters 1–3, pp. 1–55.

http://www.brite.com.

* cited by examiner

*Primary Examiner*—Allan Hoosain
(74) *Attorney, Agent, or Firm*—Barry W. Chapin, Esq.; Chapin & Huang, LLC

(57) ABSTRACT

A method and system for interactive message communication, including the steps of receiving a marked up e-mail by an interactive voice response system, the marked up e-mail containing a menu, converting the menu from text speech, producing a speech menu, reading the speech menu from the interactive voice response system to a telephone unit, and transmitting a response to the marked up e-mail based on the speech menu.

7 Claims, 3 Drawing Sheets

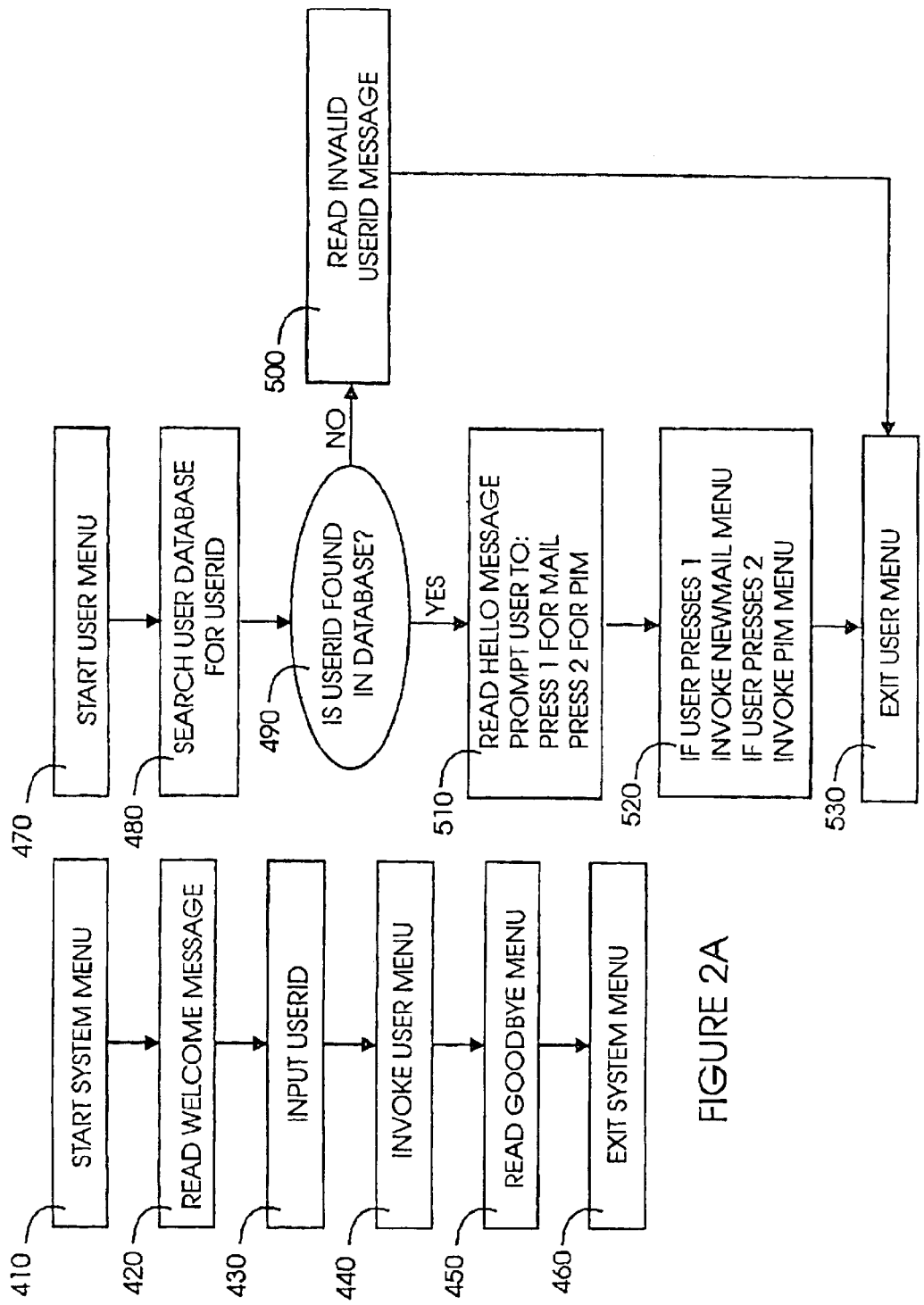

METHOD AND SYSTEM FOR INTERACTIVE MESSAGING

FIELD OF THE INVENTION

The present invention relates to tele-communication.

BACKGROUND OF THE INVENTION

Computerized telephony provides integrated e-mail, voice messages, phone calls and faxes in all-digital form. Such systems can provide functionality such as interactive voice response, call tracking, transaction histories, unique call ID's, and much more. For a detailed description of a computerized telephony product, refer to the Internet site of brite.com.

One drawback of computerized telephony systems is that a mobile subscriber dialing in to his voice response system is limited in what functions he can perform in response to input he receives. The mobile subscriber can only carry out a fixed set of actions that have been pre-programmed into the voice response system, and as such his ability to reply to incoming messages is restricted. For example, he may only be able to reply to conventional voice mail by dictation into the voice response system.

SUMMARY OF THE INVENTION

The present invention provides a method for a mobile subscriber to access his e-mail by dialing in to an interactive voice response system, and to reply to his e-mail by pressing one or more keys on his telephone. It also provides a means whereby a subscriber is notified in advance whenever e-mail arrives at the interactive voice response system. In a preferred embodiment, the present invention uses a special type of e-mail, referred to below as an interactive message (IM) since it provides the capability for its recipient to reply by pressing keys on a telephone pad.

The present invention also provides a method and system for creating interactive messages and for transmitting them to an interactive voice response system.

The interactive message of the present invention preferably includes three parts: a message, a menu and header fields with parameters. In one embodiment of the present invention the message is a text message. In an alternate embodiment of the present invention the message is an audio file. The menu contains an indexed list of replies that a subscriber can select from by indicating the index number of a desired reply. The voice response system reads the replies to the listening subscriber who has dialed in, and in turn the subscriber selects one of the replies by pressing on one or more keys on the telephone. The selected reply is then formatted as an e-mail message, and sent back to the original sender.

The present invention offers mobile subscribers the opportunity to receive e-mail and respond, without being connected to the Internet, and without having to call up the sender. Using the present invention, a remote subscriber can dial up his voice response system using a cellular or conventional telephone, after being notified of an arriving e-mail, he can listen to the e-mail and he can send back a reply e-mail. He can also instruct the voice response system to perform specific actions in response to the e-mail, such as faxing back a reply, requesting information or making a transaction.

Whereas prior art voice response systems only provide a fixed set of pre-programmed reply actions, the present invention enables a creator of an IM to customize his own set of reply action alternatives on an individual message-by-message basis. The receiver of such an IM need only press on one or more keys of his telephone to select one of the reply action alternatives and initiate the action. In broad terms, prior art voice response systems only provide a preprogrammed fixed set of possible reply actions, this set thus being system-specific. The voice response system of the present invention provides for a message-specific set of possible reply actions, this set being customizeable for each individual message.

The present invention also enables generation of dynamic menus within an IM. For example, an interactive voice response system can generate a menu based on a subscriber's userid. The userid can be used to indicate a category to which the subscriber belongs (such as "platinum cardholder," "gold cardholder" or "standard cardholder"), and the menu presented to the subscriber upon dial-up to the voice response system can be generated dynamically for that category. This provides for different sets of possible reply actions for different categories of subscribers. Generation of interactive messages with dynamic menus can be carried out by the interactive voice response system itself.

There is thus provided in accordance with a preferred embodiment of the present invention a method for interactive message communication, including the steps of receiving a marked up e-mail by an interactive voice response system, the marked up e-mail containing a menu, converting the menu from text to speech, producing a speech menu, reading the speech menu from the interactive voice response system to a telephone unit, and transmitting a response to the marked up e-mail based on the speech menu.

There is also provided in accordance with a preferred embodiment of the present invention a method for interactive message communication, including the steps of monitoring an e-mail server for the presence of marked up e-mail, downloading marked up e-mail from the e-mail server to an e-mail client within an interactive voice response system after the monitoring step indicates its presence at the e-mail server, sending by the interactive voice response system a notification to a subscriber of the presence of marked up e-mail at the interactive voice response system, calling by the subscriber from a telephone unit to the interactive voice response system to retrieve at least one marked up e-mail, and replying to the retrieved at least one marked up e-mail by the telephone unit.

There is also provided in accordance with a preferred embodiment of the present invention a method for interactive message communication, including the steps of creating a marked up e-mail including header fields and parameters, and a menu, and transmitting the marked up e-mail to an interactive voice response system.

There is also provided in accordance with a preferred embodiment of the present invention a method for interactive message communication, including the steps of creating a marked up e-mail including a menu, transmitting the marked up e-mail to an interactive voice response system, converting the menu from text to speech, producing a speech menu, reading the speech menu from the interactive voice response system to a telephone unit, and transmitting a response to the marked up e-mail based on the speech menu.

There is also provided in accordance with a preferred embodiment of the present invention a method for interactive voice response including the steps of detecting the arrival of marked up e-mail, receiving the marked up e-mail, parsing the marked up e-mail, deriving voice menus based on the marked up e-mail, transmitting the voice menus, and interpreting telephone tones in response to the voice menus.

There is also provided in accordance with a preferred embodiment of the present invention an interactive message communication system, including an interactive voice response system receiving a marked up e-mail, the marked up e-mail containing a menu, and reading a speech menu to a telephone unit, a text-to-speech converter converting the menu from text to speech, producing a speech menu, and a telephone unit receiving the speech menu, and transmitting to the interactive voice response system a response to the marked up e-mail based on the speech menu.

There is also provided in accordance with a preferred embodiment of the present invention an interactive message communication system including an event engine monitoring an e-mail server for the presence of marked up e-mail, an interactive voice response system containing an e-mail client and downloading marked up e-mail from the e-mail server to the e-mail client after the event engine indicates its presence at the e-mail server, and sending a notification to a subscriber of the presence of marked up e-mail, and a telephone unit calling the interactive voice response system to retrieve at least one marked up e-mail, and replying to the retrieved at least one marked up e-mail.

There is also provided in accordance with a preferred embodiment of the present invention an interactive message communication system, including a mail creation tool creating a marked up e-mail including header fields and parameters, and a menu, and a transmitter transmitting the marked up e-mail to an interactive voice response system.

There is also provided in accordance with a preferred embodiment of the present invention an interactive message communication system, including a mail creation tool creating a marked up e-mail including a menu, an interactive voice response system receiving a marked up e-mail, and transmitting a speech menu to a telephone unit, a text-to-speech converter converting the menu from text to speech, producing a speech menu, and a telephone unit receiving the speech menu, and transmitting to the interactive voice response system a response to the marked up e-mail based on the speech menu.

There is also provided in accordance with a preferred embodiment of the present invention an interactive voice response system including an event engine for detecting arriving marked e-mail, an e-mail client for receiving marked up e-mail, a mail interpreter for parsing marked up e-mail, a programming engine for programming voice menus based on the marked up e-mail, and an tone interpreter for interpreting telephone tones in response to the voice menus.

There is also provided in accordance with a preferred embodiment of the present invention an interactive message including a marked up language version including a menu, and header fields and parameters.

There is also provided in accordance with a preferred embodiment of the present invention a method for handling an interactive message containing a marked up language version and a natural language version, including dispatching the marked up language version as a MIME attachment and dispatching the natural language version as an SMTP-compliant e-mail.

BRIEF DESCRIPTION OF THE DRAWINGS

The present invention will be more fully understood and appreciated from the following detailed description, taken in conjunction with the drawings in which:

FIGS. 2A–2D illustrate the operation of an interactive voice response system in accordance with a preferred embodiment of the present invention.

LIST OF APPENDICES

Figure 1:
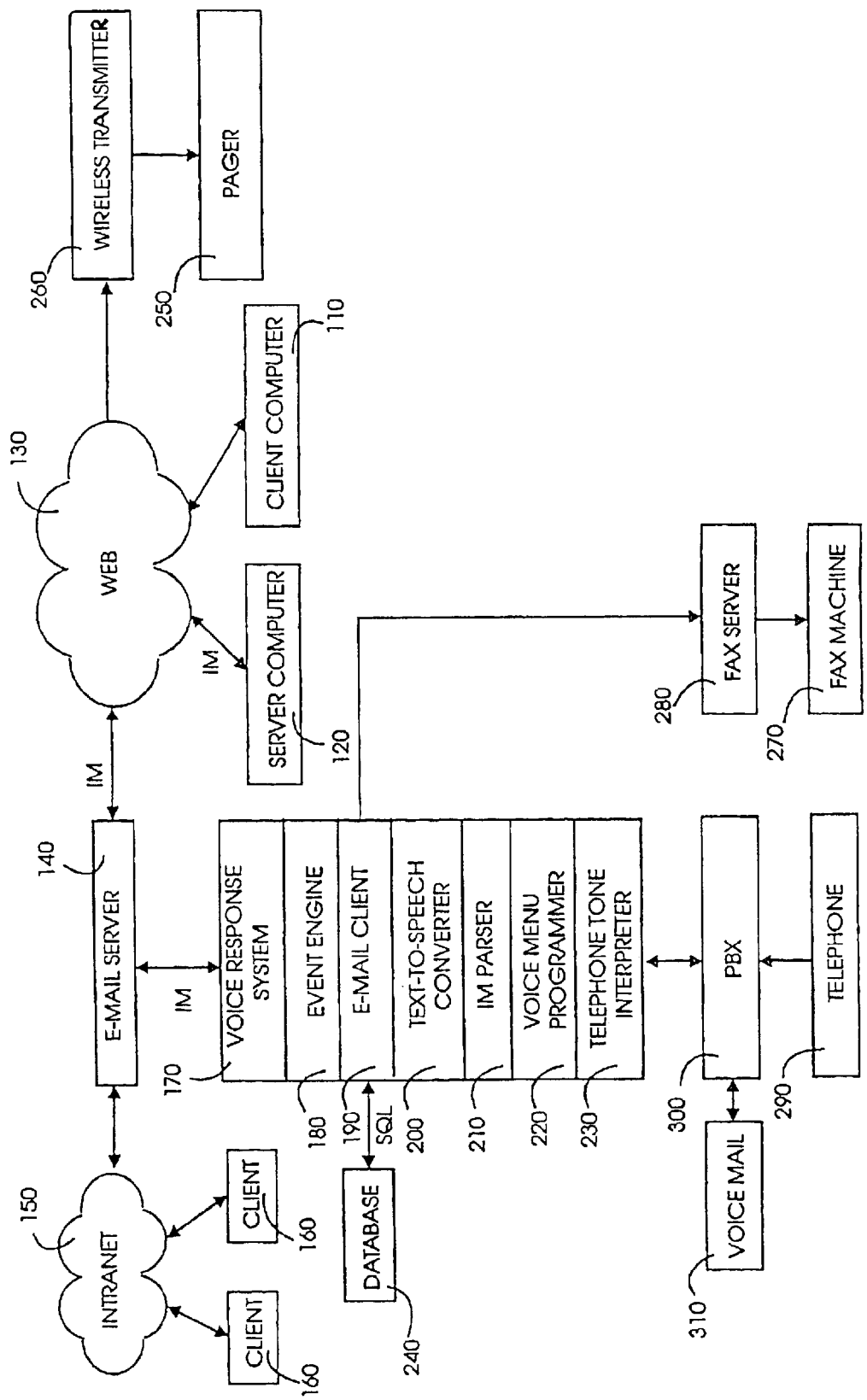
FIG. 1 is a simplified schematic diagram of a preferred embodiment of the present invention whereby an IM is created and sent, a mobile subscriber is notified of its arrival and replies by means of a telephone unit.

Appendix A is a listing of interactive voice response menus in XML syntax, in accordance with a preferred embodiment of the present invention.

DETAILED DESCRIPTION OF A PREFERRED EMBODIMENT

Internet browsers brought with them the advent of visual Internet as we know it today. Prior to web browsing Internet communication was predominantly carried out through a command line interface, whereby displays were text-only and information was obtained by downloading files via transfer protocols such as ftp. At the core of web browsing lies the HyperText Markup Language (HTML) page.

HTML is a language for describing page layouts. HTML works with basic objects referred to as universal resource locators (URLs) that contain IP addresses for objects along with optional commands to execute. HTML provides a designer with the ability to position text and graphics in a page, specify fonts, colors, background patterns, play audio files, link to other HTML pages and much more. Each screen that appears when a client browses the web is rendered from an HTML page, and most Internet browsers enable one to view the HTML source page corresponding to a display. Web designers typically work with object files, such as images, audio and video, and create compelling HTML pages for laying them out. A reference for HTML is the specification "HyperText Markup Language" located at http://www.204.57.196.12/reference/htmlspec2.0/html-sopec281194_1.html.

Recently there has been progress in enabling appliances without video displays to also access information from the Internet. Wireless devices such as pagers can now use a new markup language, Handheld Device Markup Language (HDML) to communicate with Internet servers. Telecommunication devices can now use a new markup language, Voice Markup Language (VoxML™), developed by Motorola, to request information from the Internet. References for HDML are (1) the article "Proposal for a Handheld Device Markup Language" located at http://www.uplanet.com/pub/hdml_w3c/hdml_proposal.html, and (2) the "Handheld Device Markup Language Specification" located at http://www.uplanet.com/pub/hdml_w3c/hdml20-1.html.

References for VoxML are (1) the article "About VoxML" located at http://voxml.com/about.html, and (2) the article "Motorola's VoxML Markup Language" available at this same location. VoxML is compliant with the eXtensible Markup Language (XML). A reference for XML is St. Laurent, Simon, *XML: A Primer,* MIS Press, Foster City Calif., 1998.

The analogy between visual and audio Internet browsing is that Internet browsers correspond to interactive voice response systems, and HTML correspond to VoxML. What HTML is to Internet browsers, VoxML is to voice response systems. VoxML is used to program a hierarchy of voice "menus," each menu being executable by a VoxML interpreter within a voice response system. Each such menu can instruct the voice response system to read audio files, accept inputs from a telephone unit, carry out specific actions such as sending a fax, and more. A VoxML menu can instruct the voice response system to invoke another VoxML menu —the same way in which HTML pages link to one another, VoxML menus link to one another.

Internet browsing opened up a wealth of information to remote users running client computers around the world. In the same fashion VoxML opens up this wealth of information to mobile users communicating with telephones around the world. Centralized information can be accessed by people on the road, thus keeping them up-to-date and enhancing the ever-growing global connectivity.

Applicant's co-pending U.S. Patent Application entitled A METHOD AND SYSTEM FOR WIRELESS DATA COMMUNICATION, the disclosure of which is hereby incorporated by reference, discloses a method and system for enabling wireless data terminals to access information from the Internet.

The present invention provides a method and system whereby a mobile subscriber can access his e-mail by dialing in to an interactive voice response system, and can reply to his e-mail by pressing on one or more keys of his telephone. In a preferred embodiment the present invention uses a special type of e-mail referred to herein as an interactive message (IM).

Whereas prior art voice response systems only provide a fixed set of pre-programmed reply actions, the present invention enables a creator of an IM to customize his own set of reply action alternatives on an individual message basis. The receiver of such an IM need only press on one or more keys of his telephone to select one of the reply action alternatives and initiate the action. In broad terms, prior art voice response systems only provide a pre-programmed fixed set of possible reply actions, this set thus being system-dependent. The voice response system of the present invention provides for a message-specific set of possible reply actions, this set being customized for each individual message.

In accordance with a preferred embodiment of the present invention, an IM preferably contains a mark up language version including a message and an indexed menu. In one embodiment of the present invention the message is a text message. In an alternate embodiment of the present invention the message is an audio file. It also contains header fields and parameters. The header fields preferably include the sender's identification, a date and time, and a subject for the message. In one embodiment of the present invention the IM also contains a natural language version corresponding to the mark up language version.

The present invention includes an IM creation tool for producing e-mail messages in the IM format. In one embodiment of the present invention, an interactive voice response system is used to download a subscriber's IM, and derive voice menus from it. In another embodiment of the present invention, the IMs are produced by the interactive voice response system itself. A subscriber dialing in to the voice response system can access an IM addressed to him, and can listen to the message therein. In addition, the voice response system reads the indexed menu, and the subscriber can then select one of the replies by pressing on one or more of his telephone keys. The selected reply is formatted as an e-mail reply, and sent back to the original sender.

The present invention also includes means for notifying a subscriber whenever an IM addressed to him has arrived at the voice response system. It also provides a means for the voice response system to monitor arrival of an IM intended for the subscriber at a remote e-mail server, and to download the IM after it arrives.

The voice response system of the present invention preferably includes: (1) an interface with a PBX telephone exchange, used for a telephony interface, (2) an e-mail client, (3) an IM engine for parsing IM messages, (4) an engine for programming voice menus, (5) an engine for interpreting tones and (6) an event engine for monitoring arriving e-mail messages. In an embodiment of the present invention where the IM contains an audio file as its message, the voice response system also includes: (7) a digital audio player.

Reference is now made to FIG. 1, which is a simplified schematic diagram of a preferred embodiment of the present invention whereby an IM is created and sent, a mobile subscriber is notified of its arrival and replies by means of a telephone unit. A user first creates an IM, which is an e-mail containing header fields and parameters, a message and a menu. Regarding the header fields, in one embodiment of the present invention a subject header field contains a unique text, such as [IM], to indicate that the e-mail is an IM. Regarding the message, in one embodiment of the present invention the message is a text message. On an alternate embodiment of the present invention the message is an audio file. The audio file can be included in the IM as an attachment, or alternatively as a URL to an audio file located elsewhere.

The IM contains a markup language version in a markup language syntax such as HTML, HDML and VoxML. The markup language version includes the message and the menu. In one embodiment of the present invention the IM may optionally also contain a natural language version of the content of the ML message. In an alternate embodiment the IM does not contain a natural language version, but such a version can be generated by filtering the IM on the fly.

The markup language version of the IM is formatted by the creation application as a Multi-Purpose Internet Mail Extension (MIME) attachment. The natural language version, if also present in the IM, is formatted as a standard Simple Mail Transfer Protocol (SMTP) compliant e-mail. MIME extends the format of Internet mail to allow non-US-ASCII textual messages, non-textual messages, multi-part message bodies, and non-US-ASCII information in message headers.

For example the header fields, message and menu of an IM might be respectively as follows:

HEADER FIELDS:
From: Bill
To: Andy
Date: Monday, Nov. 2, 1998, 9:30:00 AM
Subject: [IM] Meeting tomorrow
MESSAGE
I have scheduled a meeting tomorrow from 2:00 PM–4:00
 PM on the topic of interactive messaging, and would be
 grateful if you could attend.
MENU
1. I plan to attend the meeting.
2. I cannot attend the meeting, but would like to send a
 substitute representative.

3. I need more information about the meeting agenda.
4. Sorry, but I am not interested in attending the meeting.
NATURAL LANGUAGE VERSION An ML message has been sent by Bill at 9:30 AM on Monday, Nov. 2, 1998 with a body: "I have scheduled a meeting tomorrow from 2:00 PM–4:00 PM on the topic of interactive messaging, and would be grateful if you could attend." and the following replies—"1. I plan to attend the meeting. 2. I cannot attend the meeting, but would like to send a substitute representative. 3. I need more information about the meeting agenda. 4. Sorry, but I am not interested in attending the meeting."

In one embodiment of the present invention, the application creating the IM runs on a client computer 110. In an alternate embodiment it runs on a server computer 120 through use of an HTML interface. In this latter case, the user creates his IM by filling in information and content on an HTML, form over the Web 130. In an embodiment of the present invention where the IM contains an audio file, the application creating the IM enables a user to dictate a message, or alternatively to include a link to an existing audio file.

After creating his IM, the user mails it to its designated recipient. The IM is then sent over Web 130 to an e-mail server 140, corresponding to the address on the e-mail, via an SMTP protocol. In one embodiment of the present invention, e-mail server 140 is connected to a corporate intranet 150 servicing many corporate clients 160.

The present specification describes an interactive voice response system 170 containing an event engine 180, an e-mail client 190, a text-to-speech converter 200, an IM parser 210, a voice menu programmer 220 and a telephone tone interpreter 230. A subscriber to the system of the present invention registers his username, and event engine 180 is programmed to monitor e-mail server 140 for any arriving IM intended for the subscriber. Event engine 180 checks e-mail server 140 regularly, for example, every 10 minutes, for the presence of an IM sent to the subscriber.

When event engine 180 detects that an IM intended for the subscriber has arrived at e-mail server 140, e-mail client 190 downloads the mark up language version of the IM to voice response system 170. In a preferred embodiment of the present invention, e-mail client 190 is connected to a database 240. Database 240 is used to cache subscriber IMs and to enable a subscriber to filter his IMs. In a preferred embodiment of the present invention, database 240 is a standard query language (SQL) database, and enables a subscriber to query and filter his inbox, of available IMs. For example, a subscriber could request the database to prepare only those available IMs originating from Bill, or only those IMs having the text string "sports" in their subject header field.

When the IM has been downloaded to voice response system 170, voice response system 170 sends a notification to the subscriber. In one embodiment of the present invention, the notification is sent to a wireless device such as a pager 250 by means of a wireless transmitter 260. The wireless device may alternatively be a cellular telephone. It is readily apparent to those skilled in the art that alternate embodiments are possible, such as voice response system 170 sending the notification to fax machine 270 via a fax server 280, or by a call to a conventional telephone.

In one embodiment of the present invention, e-mail server 140 sends a natural language version of the IM to the subscriber via an SMPT protocol. As described hereinabove, the natural language version can either be part of the IM, or alternatively it can be derived from the IM. After being sent, however, the IM remains on e-mail server 140 at least until such time as it is removed from e-mail server 140 by voice response system 170.

When voice response system 170 has received the markup language version of the IM, its contents are parsed by IM parser 210, and then used by voice menu programmer 220 to program voice menus in voice response system 170. Voice menu programmer uses text-to-speech converter 200 to convert the text portions of the IM to voice responses. In an embodiment of the present invention where the IM contains an audio file, voice menu programmer incorporates the audio file into the voice responses.

The subscriber, upon receiving notification of an incoming IM, calls voice response system 170 from a telephone unit 290. Telephone unit 290 may be a conventional or a cellular telephone. In one embodiment of the present invention, telephone unit 290 connects to voice response system 170 by means of a PBX telephone exchange 300, also used to access the subscriber's voice mail 310.

Upon the subscriber's dialing in to voice response system 170, voice response system reads a message based on the incoming IM. Referring to the abovementioned example, the subscriber will hear: "You have a message from Bill (the sender identified in the "From" header field of the IM) at 9:30 AM on Monday, Nov. 2, 1998 (the date and time identified in the "Date" header field of the IM). I have scheduled a meeting tomorrow from 2:00 PM–4:00 PM on the topic of interactive messaging, and would be grateful if you could attend." This is followed by "Press 1 for 'I plan to attend the meeting.' Press 2 for 'I cannot attend the meeting, but would like to send a substitute representative.' Press 3 for 'I need more information about the meeting agenda' Press 4 for 'Sorry, but I am not interested in attending the meeting.'"

Upon the subscriber's pressing on the 1, 2, 3 or 4 numerical telephone key, telephone tone interpreter 230 translates the tone, and voice response system 170 generates a corresponding standard SMTP reply e-mail message. The reply e-mail message is then sent as a reply to Bill (the sender identified in the "From" header field of the IM). If the subscriber presses the 3 key of telephone unit 290, then voice response system 170 sends an e-mail to Bill with the following text: "You sent 'I have scheduled a meeting tomorrow from 2:00 PM–4:00 PM on the topic of interactive messaging, and would be grateful if you could attend.' Andy replied 'I need more information about the meeting agenda.'"

In another embodiment of the present invention the menu contains a list of actions to be performed by voice response system 170. Examples of actions include: (1) contacting the sender by phone, (2) contacting the sender by fax, (3) requesting information, (4) making a transaction, and (5) authorizing (or denying authorization for) a transaction. The creator of an IM can specify action-based alternatives for the menu, and the subscriber, upon receiving such an IM, can select one of the action alternatives to be carried out as a reply by pressing on one or more keys of telephone unit 290.

It can thus be appreciated that whereas prior art voice response systems can only carry out a fixed set of pre-programmed reply actions, the present invention enables the creator of an IM to provide his own set of actions. In other words, whereas the possible set of reply actions that can be carried out by subscribers to prior art voice response systems is system-specific, the present invention makes it possible for the possible set of reply actions to be individual message-specific.

In another embodiment of the present invention, the menu of an IM is generated dynamically. For example, the menu can be based on the userid. An example application where this feature is useful is a financial institution having a variety of customer categories. The menu presented upon dial-up can depend on the customer category. Customers with larger accounts can be offered a different menu selection than those with smaller accounts.

In another embodiment of the present invention, the IM need not contain a message. For example, when dynamic menu generation is used as in the abovementioned example, the initial IM presented to a customer upon dialing in can contain a menu without a message. The voice response system can begin at once with a menu selection, without reading a message. In these latter two embodiments the IM can be generated by the interactive voice response system itself.

Reference is now made to Appendix A, which is a listing of interactive voice response menus in XML syntax, in accordance with a preferred embodiment of the present invention. The first file SYSTEM.XML contains the system instructions when the subscriber calls in to the voice response system. The first portion of this file contains an audio message, referenced by AMSG, which reads the welcome audio file welcome.VOX. The subscriber is then prompted for a four digit userid and the menu from file USER.ELML is executed. After completing USER.ELML the system plays another audio message, goodbye.VOX and terminates.

USER.ELML begins by searching a user database using a standard query language (SQL) query to identify the current subscriber's userid that was keyed in. If no such userid is found, an audio message is played from audio file invalid-.VOX indicating to the caller that his userid is invalid. Otherwise, if the userid is found in the database, the system determines the subscriber's name and reads "Hello <subscriber-name>, press 1 for mail press 2 for pim."

If the subscriber presses 1 for mail, then the menu from file NEWMAIL.ELML is executed. Upon completing NEWMAIL.ELML the menu USER.ELML is also completed.

NEWMAIL.ELML begins by searching for the subscriber's new mail using an SQL query. If no new mail is found, a "No new mail" message is read. Otherwise, if n new mail items are found, the system reads "You have n new messages. Press 1 to listen to mail." If the subscriber presses 1 then the menu from file MAIL.ELML is executed. Upon completing MAIL.ELML the menu NEWMAIL.ELML is also completed.

MAIL.ELML begins by searching for the subject fields in the subscriber's new mail. If no new mail is found, a "No new mail" message is read. Otherwise, the system loops through the new mail and reads the subjects. MENU.ELML is completed when the loop finishes reading the subjects from all new mail.

Reference is now made to FIGS. 2A–2D, which illustrate the operation of an interactive voice response system in accordance with a preferred embodiment of the present invention. FIGS. 2A, 2B, 2C and 2D correspond to files SYSTEM.ELML, USER.ELML, NEWMAIL.ELML and MAIL.ELML, respectively, from Appendix A.

FIG. 2A is a simplified illustration of the master system menu for an interactive voice response system in accordance with a preferred embodiment of the present invention. When a subscriber dials in to the system, a system menu is started at step 410. At step 420 the voice response system reads a welcome message to the subscriber, and prompts him to enter his userid. At step 430 the subscriber enters his userid by pressing on keys of his telephone. At step 440 the system invokes a user menu. The user menu is illustrated in FIG. 2B. After completing the user menu, the system reads a goodbye menu at step 450 and exits at step 460.

Figure 2D:
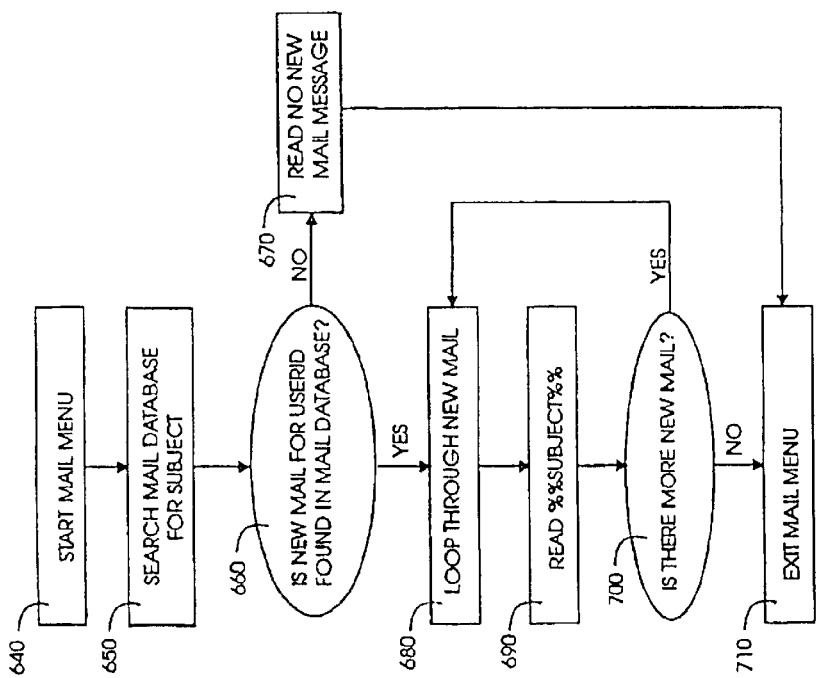
Figure 2C:
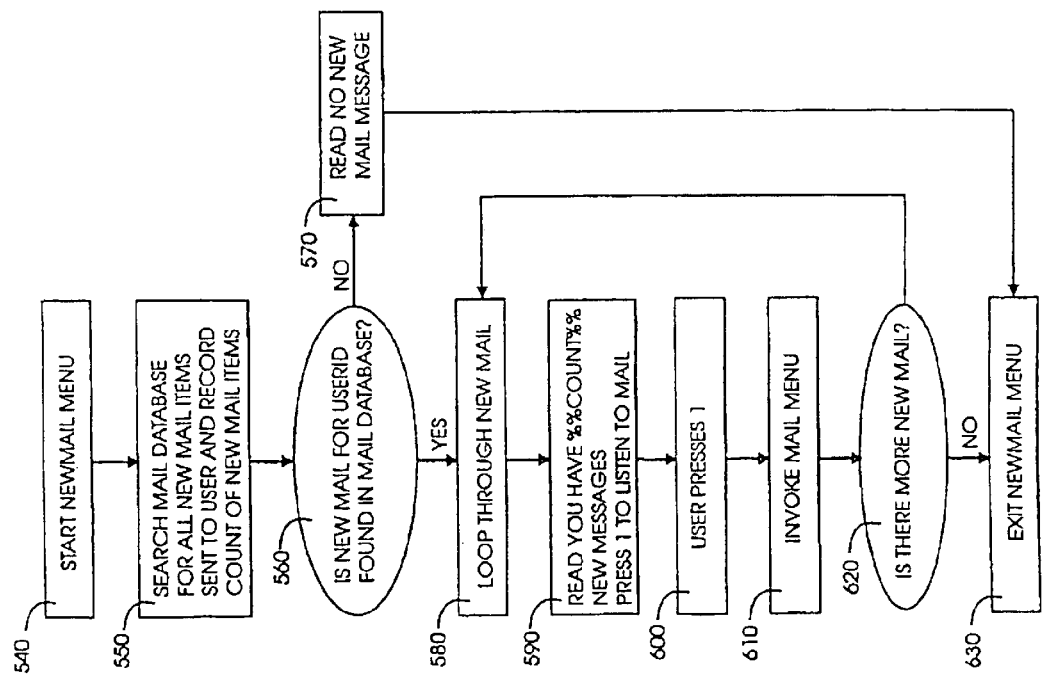

FIG. 2B is a simplified illustration of a user menu for an interactive voice response system in accordance with a preferred embodiment of the present invention. The user menu is started at step 470. At step 480 the system searches for the userid in a user database, by means on an SQL query. At step 490 the system checks whether or not the userid input has been found in the user database. If not, at step 500 the system reads an "invalid userid" message and then exits the user menu at step 530. Otherwise, if the userid is present in the user database the system can identify the subscriber by name. At step 510 the system reads a hello message to the subscriber, referencing the subscriber by his name, and prompts him to press the "1" key to check his mail, and the "2" key for his personal information manager (PIM). At step 520 the system checks what the subscriber has pressed. If he pressed 1 the system invokes a newmail menu. If he pressed 2 the system invokes a pim menu. The newmail menu is illustrated in FIG. 2C. The pim menu is not illustrated. After executing the newmail or pim menu the system exits the user menu at step 630.

FIG. 2C is a simplified illustration of a newmail menu for an interactive voice response system in accordance with a preferred embodiment of the present invention. The newmail menu is started at step 540. At step 550 the voice response system searches, by means of an SQL query, an e-mail database for new e-mail items sent to the subscriber, and records the count of how many such e-mail items were found. At step 560 the system checks whether or not new e-mail was found. If not, at step 570 the system reads a "no new mail" message to the subscriber and then exits the newmail menu at step 630. Otherwise, if new mail is found, then at step 580 the system loops through each new mail item, and reads a message to the subscriber indicating how many e-mail items he has in the system, and prompting him to press 1 to listen to his mail. At step 600 the subscriber presses the "1" key of his telephone, and at step 610 the system invokes the mail menu. The mail menu is illustrated in FIG. 2D. Upon completing the mail menu the system continues looping through the new mail at step 620. When the loop finishes, and all new mail has been processed, the system exits the newmail menu at step 630.

FIG. 2D is a simplified illustration of a mail menu for an interactive voice response system in accordance with a preferred embodiment of the present invention. The mail menu is started at step 640. At step 650 the voice response system searches, by means of an AQL query, the e-mail database for the subject field of new e-mail items. At step 660 the system checks whether or not new e-mail was found. If not, at step 670 the system reads a "no new mail" message to the subscriber, and then exits the mail menu at step 710. Otherwise, if new mail is found, then at step 680 the system loops through each new mail item, and reads a message to the subscriber with the subject of each mail item. The system continues looping through the new mail at step 700. When the loop finishes the system exits the mail menu at step 710.

It is clear from the above discussion that many variations on the above described system architecture are possible without deviating from the spirit of the present invention. For example, one variation is that the replies in the menu can be encoded with acronyms rather than numerals.

Another variation is to have the interactive voice response system verify the subscriber's tone press in order to prevent erroneous replies. Such verification can be carried out by requesting the subscriber to confirm his response.

Another variation is for the voice response system to provide the subscriber with the opportunity to repeat the message or the menu, before the subscriber responds.

Another variation is for the voice response system to enable the user to indicate that he prefers not to select any of the possible replies, a "none of the above" option.

Another variation is for the subscriber to select a reply by speaking into the telephone unit, rather than pressing on one or more keys. In this embodiment telephone tone interpreter 230 is replaced by a voice interpreter.

Another variation is for there to be no notification of an arriving IM. Instead, a subscriber dials up the voice response system from time-to-time to check whether or not there is an IM waiting for him.

Another variation is for the menu of the IM to include a set of audio files, rather than a set of text replies of action replies. In this case there is no need for text-to-speech conversion within the voice response system. This variation can arise in (1) a situation where the IM is initially created with a menu of audio files, or (2) in a situation where the IM is initially created with a menu of text replies, that are pre-converted to speech prior to the IM arriving at the voice response system.

Thus it will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

APPENDIX A

SYSTEM.ELML

```
<ELML>
    <AMSG
    FILENAME="C:/Progra~1/ElectricLighthouse/VOX/welcome.VOX"/>
        <!--welcome, please enter access code-->
    <INPUT TYPE="ACTION_DIGIT" NUMBER="4">
        <NEXTMENU
            MENU="C:/Progra~1/ElectricLighthouse/Elml/USER.ELML"/>
    </INPUT>
        <!--e.g. function(filename,IVR_RESPONSE);-->
    <AMSG
    FILENAME="C:/Progra~1/ElectricLighthouse/VOX/goodbye.VOX"/>
</ELML>
```

USER.ELML

```
<ELML>
    <SQL QUERY="SELECT * FROM USERS WHERE ID=%ACTION_DIGIT%">
        <NOROWS>
            <AMSG
    FILENAME="C:/Progra~1/ElectricLighthouse/VOX/invalid.VOX"/>
        </NOROWS>
        <LOOPROWS>
            <MSG>Hello %%Name%%, press 1 for mail press 2 for
                pim</MSG>
            <INPUT TYPE=DIGIT NUMBER=1>
                <OPTION VALUE=1
    NEXTMENU="C:/Progra~1/ElectricLighthouse/Elml/NEWMAIL.ELML
    ?ACTION_DIGIT=%ACTION_DIGIT%">
                </OPTION>
                <OPTION VALUE=2
    NEXTMENU="C:/Progra~1/ElectricLighthouse/Elml/PIM.ELML">
                </OPTION>
            </INPUT>
        </LOOPROWS>
    </SQL>
</ELML>
```

NEWMAIL.ELML

```
<ELML>
    <SQL QUERY="SELECT COUNT(NEW) AS COUNTOFNEW FROM MAIL
    WHERE NEW=1 AND ID=%ACTION_DIGIT%">
        <NOROWS>
            <MSG>No new mail</MSG>
        </NOROWS>
        <LOOPROWS>
            <MSG>You have %%COUNTOFNEW%% new messages. Press 1 to
                listen to mail</MSG>
            <INPUT TYPE=DIGIT NUMBER=1>
                <OPTION VALUE=1
    NEXTMENU="C:/Progra~1/ElectricLighthouse/Elml/MAIL.ELML?
    ACTION_DIGIT=%ACTION_DIGIT%"
                </OPTION>
            </INPUT>
        </LOOPROWS>
```

-continued

APPENDIX A

```
    </SQL>
</ELML>
MAIL.ELML

<ELML>
    <SQL QUERY="SELECT Subject FROM Mail WHERE
ID=%ACTION_DIGIT% AND new=1">
        <NOROWS>
            <MSG>No new mail</MSG>
        </NOROWS>
        <LOOPROWS>
            <MSG>%%Subject%%</MSG>
        </LOOPROWS>
    </SQL>
</ELML>
    <!-- SQL QUERY="SELECT Subject FROM Mail WHERE
        ID=%ACTION_DIGIT% AND new=1; UPDATE Mail SET new=0 WHERE
        ID=%ACTION_DIGIT% AND new=1;" -->
```

What is claimed is:

1. A method for interactive message communication, comprising the steps of:

creating a marked up e-mail including header fields and parameters, and a menu; and transmitting the marked up e-mail to an interactive voice response system, wherein the marked up e-mail uses an XML protocol and wherein said creating step is performed by means of an HTML interface to a server computer.

2. The method of claim 1 wherein said creating step is performed on a client computer.

3. The method of claim 1 and wherein the interactive voice response system contains an e-mail client.

4. The method of claim 3 and also including the step of sending the marked up e-mail to an e-mail server.

5. The method of claim 4 wherein said transmitting step transmits the marked up e-mail from the e-mail server to the e-mail client within the interactive voice response system.

6. The method of claim 5 wherein said transmitting step is initiated by an event engine within the interactive voice response system.

7. The method of claim 6 and also including the step of monitoring by the event engine the arrival of a marked up e-mail at the e-mail server addressed to a designated subscriber.

* * * * *